UNITED STATES PATENT OFFICE.

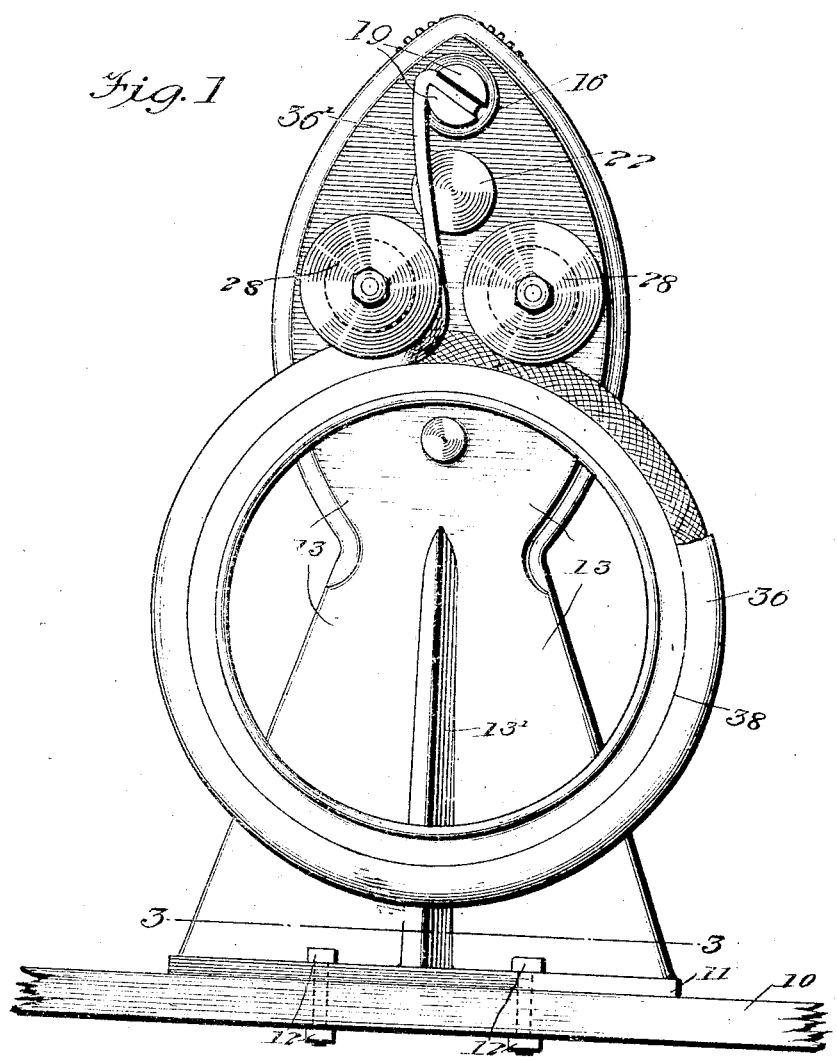
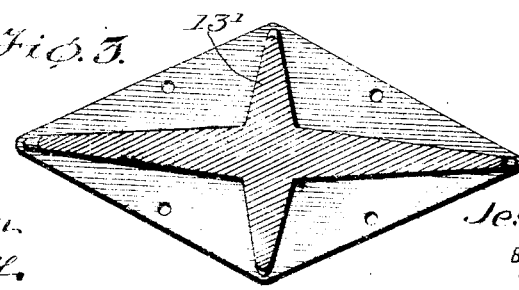

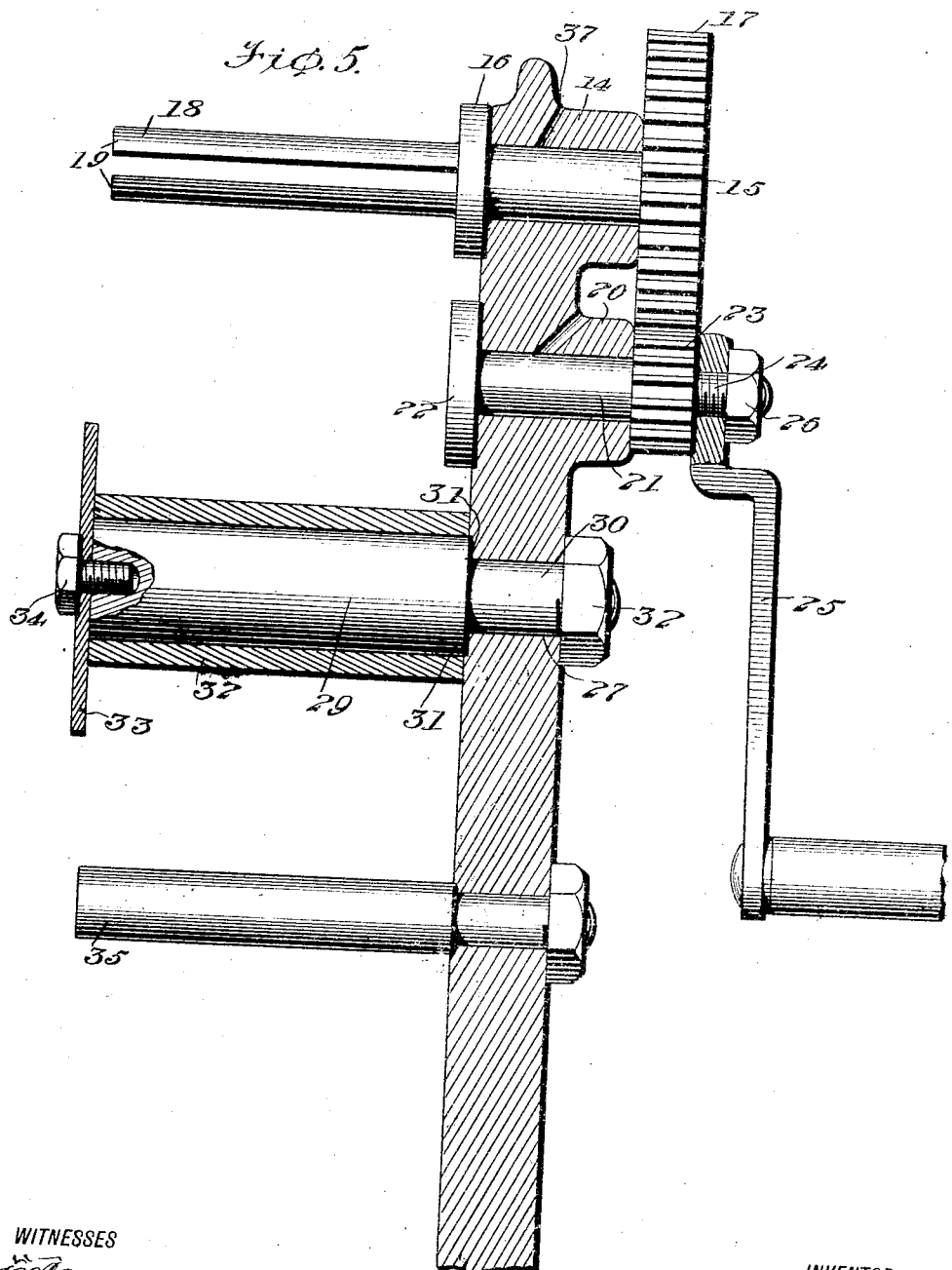

JESSE SCHMIDT, OF TRACY, CALIFORNIA.

TIRE-TREAD PULLER.

1,354,849.  Specification of Letters Patent.  Patented Oct. 5, 1920.

Application filed June 20, 1919. Serial No. 305,469.

*To all whom it may concern:*

Be it known that I, JESSE SCHMIDT, a citizen of the United States, and a resident of Tracy, in the county of San Joaquin and State of California, have invented certain new and useful Improvements in Tire-Tread Pullers, of which the following is a specification.

My invention relates to tire tread pullers. An important object of my invention is to provide a tire tread puller in which the pulling action is so exerted and in which the tire is automatically so positioned during the pulling action that the tread will be completely and cleanly removed from the tire carcass.

Figure 2:
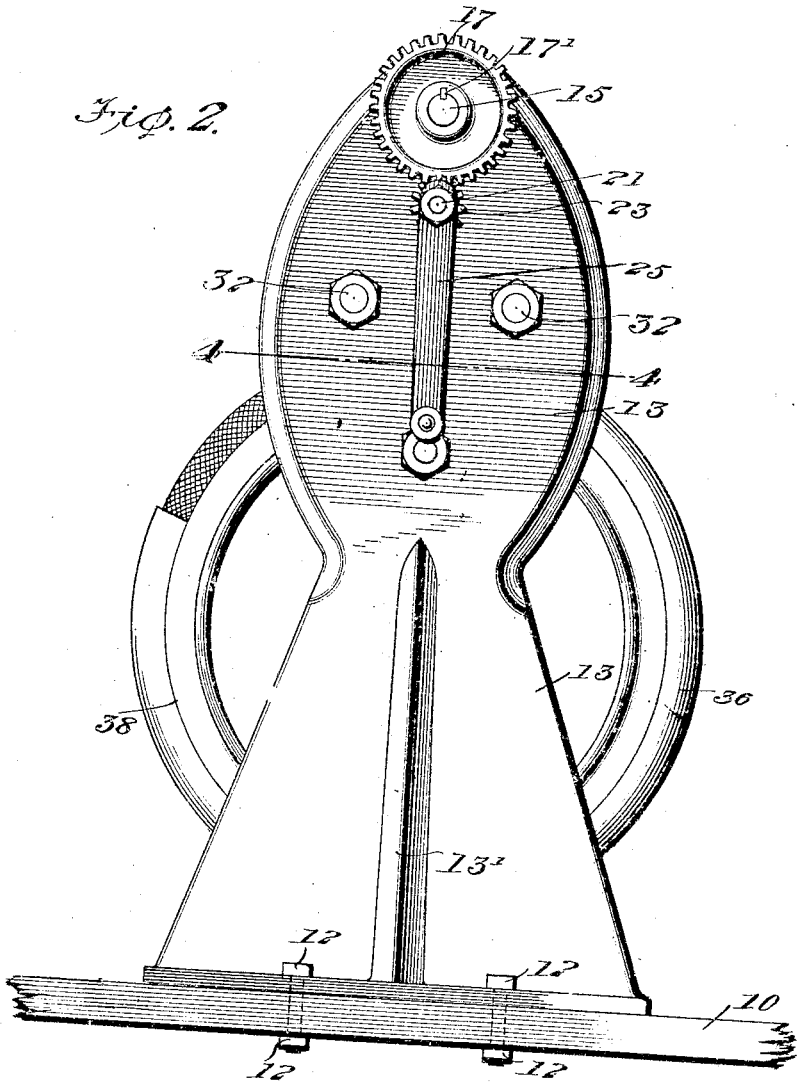
Figure 4:

Other objects and advantages reside in certain novel features of the construction, arrangement and combination of parts and will become apparent as the description proceeds, reference being had to the accompanying drawings forming part of this specification and in which:

Figure 1 represents a side elevation of the machine disclosing the position of the tire during pulling operation, Fig. 2 represents a side elevation of the machine taken on the opposite side from Fig. 1, Fig. 3 is a cross section of the lower portion of the frame taken on line 3—3 of Fig. 1, Fig. 4 is a cross section of the upper portion of the machine taken on line 4—4 of Fig. 2, Fig. 5 is a vertical section through the upper portion of the machine parts being shown in elevation for the sake of illustration.

Referring to the drawings the numeral 10 indicates a support on which the machine is mounted. This support may be in the form of sills or may constitute the flooring of the place in which the machine is utilized. To this support 10 a base 11 of the machine is secured by means of bolts and nuts 12 or any suitable fastening means. The frame of the machine, indicated generally by 13, stands on the base 11 and this frame is preferably formed integral with the base 11 and consists of a lower portion and an upper portion. The lower portion is preferably provided with reinforcing webs 13' which are formed integral with the base and the lower portion of the frame and are widest at the base and gradually decrease in cross sectional area as indicated in Fig. 3. The upper portion of the frame is formed integral with the lower portion and presents the cross section shown in Fig. 4. The upper portion of the frame is preferably adapted to carry the operating parts of the machine and is provided with suitable journals for this purpose to be hereinafter more fully described.

At the extreme portion of the frame and disposed centrally thereof is a bearing 14. A winding shaft 15 is journaled in this bearing, preferably horizontal, and is provided at its inner end with a collar 16 and at its outer end with a large gear 17. The collar is preferably formed integral with the shaft and the large gear is fixed thereto by means of a key 17'. Extending in alining relation with the winding shaft and preferably formed integral with the collar thereof is a winding arbor 18. This winding arbor 18 consists of spaced semicircular portions 19 which define a slot extending from its outer end to the collar. Directly below the winding shaft bearing 14 is provided a power shaft bearing 20, the axis of which is preferably in the same vertical plane as the axis of the winding shaft bearing. Journaled in this bearing is a power shaft 21 having a collar 22 formed integral therewith at its inner end and a small gear 23 secured on its outer end and meshing with the large gear 17. The shaft 21 is provided with a threaded extension 24 and upon this extension a hand crank 25 is mounted and secured by a nut 26. It is to be understood however that a motor or other suitable means may be employed to impart power to the power shaft 21.

Symmetrically disposed on each side of the center line of the machine and slightly below the power shaft are provided guide roller bearings 27, also preferably horizontal. Guide rollers indicated generally by 28 are journaled in these bearings. As these guide rollers are identical a description of one will serve as a description of both. The stud shaft 29 of each guide roller is provided with a reduced extension 30 which extends through and is journaled in the roller bearing. The shoulder 31 together with the nut 32 serves to rigidly secure the stud shaft to the frame. Rotatably mounted on the stud shaft is a roller 32 and this roller is maintained on the stud shaft by a circular plate 33 secured to the outer end of the stud shaft by a screw 34.

A pin 35 is rigidly secured to the frame of the machine directly below the winding arbor having its center coincident with the center line of the frame as shown in Fig. 5. This pin is intended to support a tire, indicated, for the sake of illustration as 36, during certain phases of the operation and is a sufficient distance below the guide rollers to allow placing and removal of the tire without any interference or engagement with the guide rollers.

The bearings for the various shafts described herein above are provided with suitable ducts 37 to facilitate lubrication.

The tire from which the tread is to be pulled is first cut around the lines 38 as shown in Figs. 1 and 2 and the tread is then started in any desired manner so as to loosen a portion thereof shown at 36'. The tire is then placed on the pin 35 and is supported thereon while the loosened end of the tread is placed in the slot of the winding arbor. The power is then applied to the power shaft preferably by means of turning the crank 25 and this motion is transmitted through the reduction gearing 23, 17 to the winding shaft and winding arbor. The pulling force or action being thus exerted the tire is lifted from the supporting pin 35 and is engaged by the guide rollers 28 which serve to automatically properly position the tire so that the pulling force of the winding arbor will have maximum effect to the end of completely and cleanly removing the tread. The action of the circular plates 33 which engages the tire is to prevent lateral displacement during the entire operation. The rollers 32 resolve the pulling force of the winding arbor into a component force which produces the proper stress to effect the pulling of the tread and a relatively small tangential component which serves to automatically feed the tire circumferentially. The component force effecting the pulling of the tread is produced by the guide rollers acting as an abutment limiting the vertical movement of the tire toward the winding arbor. The component force effecting the feed of the tire to the proper position with respect to the line of action of the pulling force is effected by the rotation of the roller 32 which rotation is imparted to the roller from the loosened portion 36' by virtue of this loosened portion bearing against the face of the roller during its movement from the tire to the winding arbor.

In this manner the tread is completely and cleanly removed from the tire being wound upon the winding arbor during this operation. The tire carcass then drops down upon the pin 35. The carcass may then be removed from the pin and the tread from the winding arbor so that the operation may be repeated as desired.

I claim:

1. A tire tread puller comprising a frame, a winding shaft, having a winding arbor adapted to engage the tread for removing the same from the tire, journaled in said frame, stud shafts secured to said frame adapted to act as abutments to limit the movement of said tire toward said winding arbor, rollers on said stud shafts to effect circumferential feed of said tire during the pulling operation and circular plates associated with said stud shafts to prevent lateral displacement of said tire.

2. A tire tread puller comprising a frame, a winding shaft, having a winding arbor adapted to engage the tread for removing the same from the tire, journaled in said frame, stud shafts secured to said frame adapted to act as abutments to limit the movement of said tire toward said winding arbor, and rollers on said stud shafts to effect circumferential feed of said tire during the pulling operation.

3. A tire tread puller comprising a frame, a winding shaft journaled in the upper portion of the frame and centrally thereof, said winding shaft having a winding arbor adapted to engage the tread for removing the same from the tire, a power shaft, reduction gearing connecting said power shaft with said winding shaft, means for actuating said power shaft, stud shafts secured to said frame and symmetrically disposed on either side of the center thereof, guide rollers on said shaft, and circular plates associated with said stud shafts.

4. A tire tread puller comprising a frame, a winding shaft journaled in the upper portion of the frame and centrally thereof, said winding shaft having a winding arbor adapted to engage the tread for removing the same from the tire, a power shaft, reduction gearing connecting said power shaft with said winding shaft, means for actuating said power shaft and stud shafts secured to said frame and symmetrically disposed on either side of the center thereof, as and for the purposes set forth.

5. A tire tread puller comprising a frame, a winding shaft journaled in the upper portion of the frame and centrally thereof, said winding shaft having a winding arbor adapted to engage the tread for removing the same from the tire, a power shaft, reduction gearing connecting said power shaft with said winding shaft, means for actuating said power shaft, stud shafts secured to said frame and symmetrically disposed on either side of the center thereof, and guide rollers on said shaft.

6. A tire tread puller comprising means for engaging the tread and pulling the same from the tire, an abutment for limiting the movement of the tire toward the tread, means for feeding the tire circumferentially during the pulling operation and means for preventing lateral displacement of the tire.

7. A tire tread puller comprising means for engaging the tread and pulling the same from the tire, an abutment for limiting the movement of the tire toward the pulling means and means for feeding the tire circumferentially during the pulling operation.

8. A tire tread puller comprising means for engaging the tread and pulling the same from the tire and means for feeding the tire circumferentially during the pulling operation.

9. A tire tread puller comprising a frame, a horizontally disposed winding shaft journaled in said frame, said winding shaft having a winding arbor adapted to engage the tread for removing the same from the tire and horizontal abutments to limit the movement of the tire toward the winding arbor.

10. A tire tread puller comprising means for engaging the tread and pulling the same from the tire and means having rolling engagement with the periphery of the tire to automatically properly position the tire with respect to the tread pulling means.

11. A tire tread puller comprising means for engaging the tread and pulling the same from the tire, an abutment for limiting the movement of the tire toward the pulling means and independent means adapted to support the tire prior and subsequent to the pulling operation.

12. A tire tread puller comprising means for engaging the tread and pulling the same from the tire, an abutment limiting the movement of the tire toward the pulling means and a roller on said abutment engaging the periphery of the tire to automatically properly position the tire with respect to the tread pulling means.

13. A tire tread puller comprising means for engaging the tread and pulling the same from the tire, an abutment for limiting the movement of the tire toward the pulling means and independent means to automatically properly position the tire with respect to the tread pulling means.

JESSE SCHMIDT.

Witness:
P. R. MATHEWS.